May 20, 1958
L. L. A. ERICKSON
2,835,223
ENCLOSURE ASSEMBLY FOR LIVESTOCK
Filed Nov. 9, 1956
2 Sheets-Sheet 1
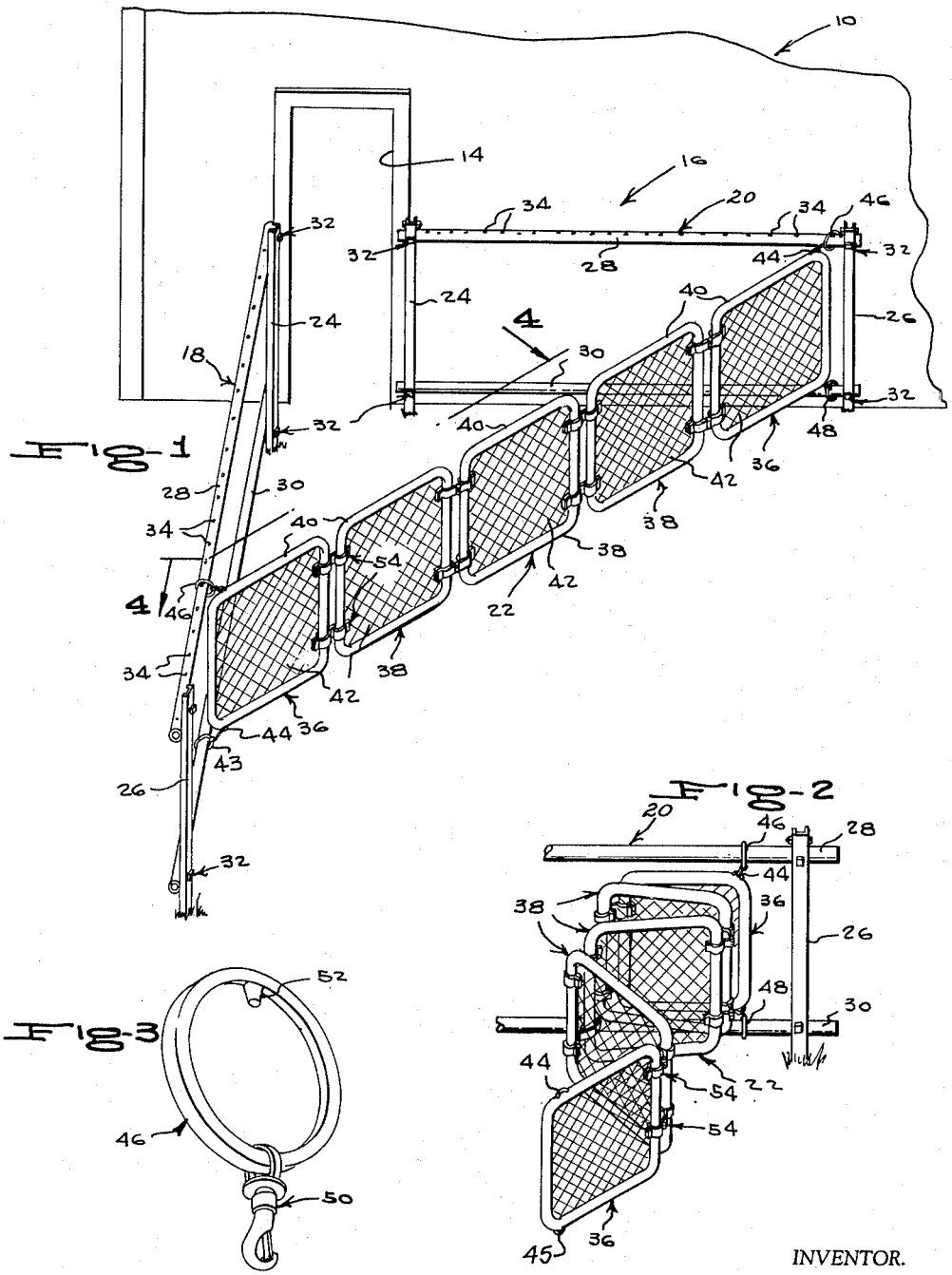
INVENTOR.
LORENA L. A. ERICKSON
BY
McMorrow, Berman + Davidson
ATTORNEYS May 20, 1958  L. L. A. ERICKSON  2,835,223
ENCLOSURE ASSEMBLY FOR LIVESTOCK
Filed Nov. 9, 1956  2 Sheets-Sheet 2
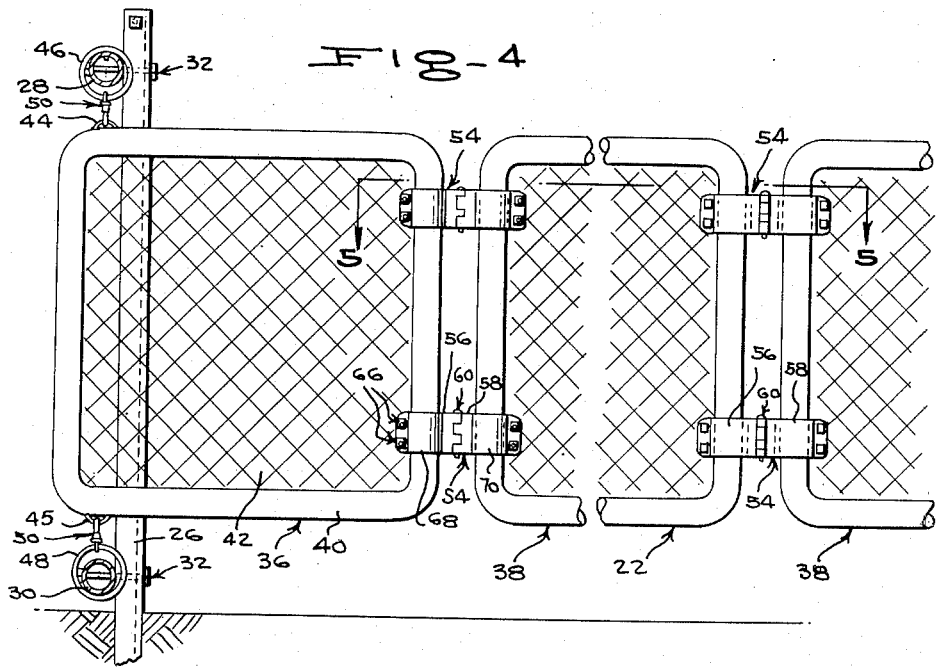
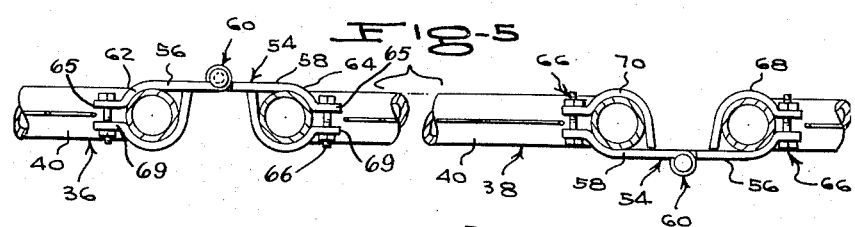
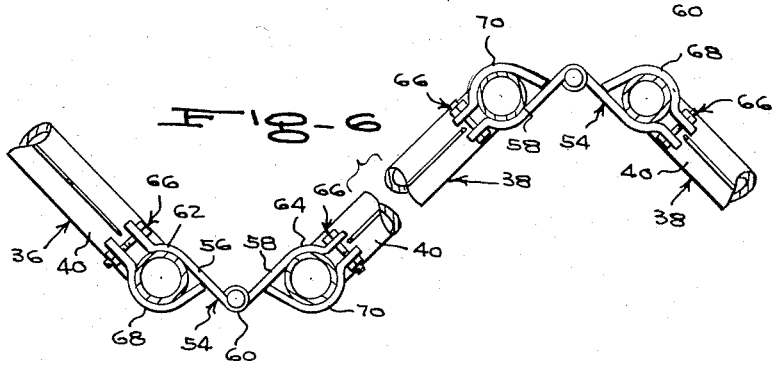
INVENTOR.
LORENA L. A. ERICKSON
BY
McMorrow, Berman + Davidson
ATTORNEYS

2,835,223
ENCLOSURE ASSEMBLY FOR LIVESTOCK

Lorena L. A. Erickson, Eau Claire, Wis.

Application November 9, 1956, Serial No. 621,307

2 Claims. (Cl. 119—20)

This invention relates to an improved portable animal enclosure, especially but not necessarily, for use in trapping animals at a barrier, such as a building wall, having a door opening, for the purpose of loading the animals on a truck, for example.

A primary object of invention is to provide an enclosure of this kind incorporating a pair of rigid fence components to be erected in converging relation to a vertical barrier, such as a wall, a fence, or a side of a barn, having an access opening therein, and a flexible and collapsible gate component, hinged on one fence component and securable to the other fence component, at selected points along the fence components.

Another object of the invention is to provide an enclosure of the character indicated wherein the gate component thereof comprises a plurality of independent panels adjacent ends of which are hingedly connected, and the panels can be disposed in substantially longitudinally extending alignment between a pair of fence components, or folded together against one of said fence components.

A further object of the invention is to provide an enclosure of the character indicated which can be readily and economically manufactured, is easily erected and maintained, and is highly satisfactory and practical for the purpose intended.

These together with other objects and advantages which will become apparent reside in the details of construction and operation, as more fully hereinafter described and claimed, reference being had to the accompanying drawings forming a part hereof, wherein like numerals refer to like parts throughout, and in which:

Figure 1 is a perspective view of an animal enclosure in accordance with the present invention, installed at a vertical barrier;

Figure 2 is a fragmentary perspective view showing the gate open and the independent gate panels partially collapsed against a fence component;

Fig. 3 is an enlarged perspective view of a gate securing ring utilizing the enclosure assembly;

Figure 4 is a fragmentary vertical section, on an enlarged scale, taken substantially on the line 4—4 of Figure 1;

Figure 5 is an enlarged fragmentary section taken substantially on the plane of line 5—5 of Figure 4; and Figure 6 is a section similar to Figure 5 showing a partly folded position of the panels.

Referring to the drawings in detail, a fragmentary part of a vertical barrier, such as a barn wall, is indicated generally at 10, having a door or access opening 14.

Indicated at 16 is an animal enclosure in accordance with the present invention, comprising a fence consisting of first and second rigid fence components, 18 and 20, respectively, and a gate 22. While a triangularly shaped enclosure is shown, the same may be made rectangular, with the vertical barrier 10 forming a side of the enclosure.

The rigid fence components 18 and 20 are identical and include inner and outer vertically extending end posts 24 and 26 of any suitable material, such as channel iron. The end posts are firmly driven into the ground for permanent installation or to be pulled from the ground if the enclosure is to be relocated or stored. Extending horizontally between the posts 24 and 26 in vertically spaced relationship are horizontally extending upper and lower rails 28 and 30, respectively, which may have a circular cross section if desired. The rails 28 and 30 are suitably spaced from each other to prevent animals passing the fence components, and are secured to the end posts 24 and 26 in any suitable manner, as by means of nut and bolt assemblies indicated generally at 32. The upper rails 28 have upwardly opening longitudinally spaced holes 34 therethrough for a purpose subsequently described herein.

The gate 22 comprises a plurality of vertical panels including end panels 36 and intermediate panels 38. The panels 36 and 38 comprise rectangular open frames 40 having secured thereacross sheets of mesh material 42. The end panels 36 have upper and lower loops 44 and 45 secured on the tops and bottoms of the frames 40 at their outer or free ends, which are flexibly connected to upper and lower rings 46 and 48, respectively, said rings including swivel snap hooks 50 detachably engageable with the loops 44 and 45. The rings 46 and 48 are identical, except that the upper rings 46 have at their tops or upper ends depending lugs 52, Figure 3, which are removably and selectively engageable in the holes 34 in the upper rails 28. The gate 22 is suspended from the rails 28 and 30 of the fence components by the upper and lower rings 46 and 48 which are circumposed on the related rails. The upper rings 46 are of sufficient diameter to permit upward displacement thereof relative to the upper rails 28 to enable longitudinal adjustment thereof along the upper rails and selective engagement of the lugs 52 in the holes 34.

Adjacent side edge portions of the panels are hingedly connected by means of hinge assemblies indicated generally at 54, which enable the panels to be disposed in longitudinally extending alignment, as shown in Figure 1, and to be folded or collapsed in substantially overlying relationship to each other at one side of one of the fence components 18 or 20.

Each hinge assembly 54 comprises a pair of upper and lower hinges each involving a pair of leaves 56 and 58, Figures 5 and 6, connected together at adjacent inner ends by pin and barrel structures 60. The hinge leaves 56 and 58 include arcuate portions 62 and 64, respectively, engaged with one side of the adjacent side members of the panel frames 40, and terminating in ears 65. Engaged with the opposite sides of the side members of the frames 40 are arcuate clamp plates 68 and 70, respectively, terminating at one end in ears 69, opposed to the ears 65, and traversed by nut and bolt assemblies 66. It will be noted that this hinge structure can be readily removed from the frames 40 to provide for insertion or removal of one or more panels in the gate.

It is further believed readily apparent that the entire enclosure assembly may be readily dismantled for transportation or storage.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed is:

1. A three-sided structure for forming a livestock enclosure in cooperation with an existing wall having a passageway therethrough comprising a pair of side fence units each having two spaced posts vertically supportable from the ground and an upper and lower rail supported by said posts, said upper rail having spaced holes along its length, a ring encircling each of said rails and slidable along the length thereof, the rings encircling each of said top rails having an inwardly projecting lug for selective engagement with one of said holes, a gate assembly including a plurality of panels hingedly connected at the edge of adjacent panels with alternately reversed hinges to enable each of said panels to fold into face-to-face opposition with adjacent panels, and detachable connectors joining said rings to the end panels of said assembly for suspending said assembly in substantially vertical position between the selected positions of said rings on said rails.

2. A three-sided structure for forming a livestock enclosure in cooperation with an existing wall comprising a pair of side fence units each having end members vertically supportable from the ground and an upper and lower horizontal rail supported by said end members, said upper rail having spaced holes along its length, a ring encircling each of said rails and slidable along the length thereof, the rings encircling each of said top rails having an inwardly projecting lug for selective engagement with one of said holes, a gate assembly including a plurality of panels hingedly connected at the edge of adjacent panels with alternately reversed hinges to enable each of said panels to fold into face-to-face opposition with adjacent panels, and detachable connectors joining said rings to the end panels of said assembly for suspending said assembly in substantially vertical position between the selected positions of said rings on said rails.

References Cited in the file of this patent

UNITED STATES PATENTS

| | | |
|---|---|---|
| 1,168,836 | Vette | Jan. 18, 1916 |
| 1,182,018 | Koenig | May 9, 1916 |